3,368,238
CEMENT APPLICATOR AND
CONTAINER THEREFOR
Edwin M. Burger, Walnut Creek, Calif., assignor to
Oliver Tire & Rubber Company, Oakland, Calif., a
corporation of California
Filed Dec. 9, 1966, Ser. No. 600,483
7 Claims. (Cl. 401—119)

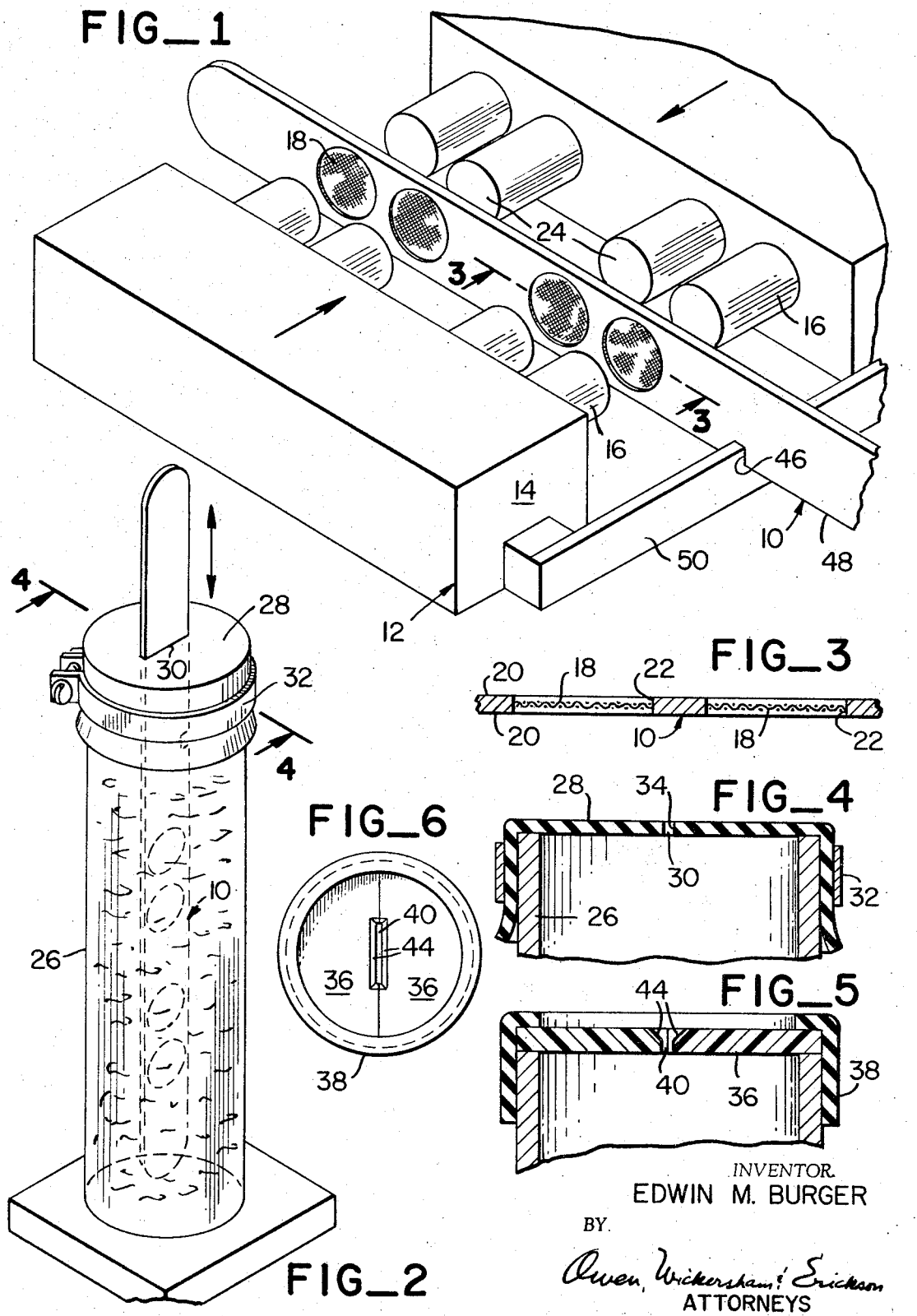
Feb. 13, 1968 — E. M. BURGER — 3,368,238
CEMENT APPLICATOR AND CONTAINER THEREFOR
Filed Dec. 9, 1966
INVENTOR.
EDWIN M. BURGER
BY
Owen, Wickersham & Erickson
ATTORNEYS

United States Patent Office 3,368,238
Patented Feb. 13, 1968

ABSTRACT OF THE DISCLOSURE

A flat, paddle-like applicator is disclosed for applying a viscous cement to the ends of articles to be spliced, having spaced apart recessed areas which retain a quantity of cement and release it when engaged by an article; and a container having a top that removes excess cement from the surface of the applicator but leaves the desired amount of cement within its recesses when the applicator is withdrawn from the container.

---

This invention relates to apparatus for applying a viscous fluid type cement or the like to preselected areas on articles that are to be joined together.

The production splicing of rubber articles, such as elongated gaskets, requires that the ends of the articles be gripped tightly in opposing jaw devices coated with a layer of rubber cement and then brought together and held for a predetermined period of time while the joint is formed. One form of apparatus for doing such splicing is shown and described in my U.S. patent application, Ser. No. 502,858, filed Oct. 23, 1965. The strength of the joint will depend to a large extent on how much cement was applied to the surfaces of the articles and how evenly it was applied, as well as the chemical properties of the cement and the amount of heat and pressure used in curing the joint. Prior to the present invention the problem arose of how to apply just the right amount of cement on the critical bonding area, evenly and consistently, with the most efficient use of the cement being supplied and with a minimum of time and unskilled labor. The general object of the present invention is to provide a unique solution to the aforesaid problem.

Another object of the present invention is to provide a device for applying cement simultaneously to the ends of a plurality of rubber articles in a butt-slicing apparatus of the type wherein the articles to be spliced are held in position and brought together after the cement has been applied.

Another object of the invention is to provide an apparatus that will enable a worker to remove viscous liquid cement from a supply container in predetermined quantities and confine it to certain areas on an applicator while the remaining surfaces of the applicator remain relatively free from the cement material, so that the applicator can be manipulated to transfer the cement to specific areas on articles to be spliced.

A more specific object of the present invention is to provide an applicator for a fluid type cement that will fit within a storage container filled with cement and will retain quantities of cement at preselected areas on the applicator when it is withdrawn from the container. Thus, when the applicator is subsequently positioned properly within the butt-splicing apparatus, the ends of the articles being spliced can be brought temporarily into engagement with the cement laden areas on the applicator to cause the cement transfer from it to the ends of the articles.

Still another object of the present invention is to provide a paddle-like applicator for applying cement to the ends of rubber articles that are to be spliced wherein the applicator has irregular surface areas for retaining the cement until it is engaged by the end face of a rubber article but which will cause the cement to be transferred almost entirely from the paddle when it engages the rubber articles.

Another object of the present invention is to provide a device for transferring cement from a container to the ends of rubber articles being connected which is precise in its distribution of the cement and also overcomes the problem of depositing cement on other parts of the apparatus which hold the articles being spliced.

A further object of the present invention is to provide a container for cement having an end portion for receiving the cement paddle that wipes excess cement off the paddle as it is withdrawn while leaving ample cement on certain areas of the paddle.

Other objects, advantages and features of the invention will become apparent from the following detailed description presented in conjunction with the accompanying drawings in which:

FIG. 1 is a view in perspective showing a cement applicator embodying the principles of the present invention as it appears when used typically for transferring cement to the ends of rubber articles retained in a butt-splicing apparatus;

FIG. 2 is a view in perspective showing the cement applicator of FIG. 1 retained in a cement container according to the present invention;

FIG. 3 is an enlarged fragmentary view in elevation and in section of one end of the cement applicator shown in FIGS. 2 and 3;

FIG. 4 is a view in section taken along the line 4—4 of FIG. 2;

FIG. 5 is an enlarged fragmentary view in elevation and in section showing a modified form of the container for the cement applicator.

FIG. 6 is a reduced plan view of the container top shown in FIG. 5.

Referring to the drawings, FIG. 1 shows a cement applicator 10 embodying the principles of the invention in a position for use with a butt-splicing apparatus 12. The latter is illustrated only schematically to represent typical devices comprising opposing pairs of clamping jaws 14 that grip the ends of a plurality of articles 16 that are to be spliced together. In such apparatus the jaws hold pairs of articles in axial alignment so that they can be moved together and held after cement has been applied to the end faces of the articles. As will become apparent, the applicator 10 may be useful in supplying cement to other articles which are held either by hand or by other types of splicing apparatus. However, it is particularly effective when used with apparatus where it can be held stationary while clamped articles are moved against it temporarily during the cement transfer process.

The applicator 10 preferably has an elongated relatively narrow paddle-like configuration and a uniform thickness substantially throughout its length. It may be made from any suitable rigid material such as wood, metal or plastic, which can provide a smooth surface where required. At predetermined locations on the applicator a number of transfer areas 18 are provided which function as wells to pick up and retain the viscous cement when the applicator is immersed in a supply of it and then to transfer the cement to the end faces of the articles in the butt-splicing apparatus. The applicator shown in the drawing has four such areas which are each circular in shape. It is to be understood that within the scope of the invention an applicator could have one or more cement transfer areas with any desired shape to accommodate articles with cross sections of various configurations. In the embodiment shown, the cement transfer areas 18 are comprised of a section of metal screen material that is parallel with but recessed below the surrounding surfaces 20 on both sides of the applicator (see FIG. 3). Each screen section of the applicator may be fixed in its recessed position in an opening 22 in the applicator by any suitable method such as by soldering its edges to the walls of the opening.

The recessed screen in each transfer area 18 essentially provides a surface with a large multiplicity of small pockets that serve to retain the cement until it contacts the end face 24 of the article being spliced. When this contact is made the cement is released cleanly and is transferred to the article after the article has first been pressed against the screen and then moved away. Other recessed means which provide a surface with a multiplicity of pockets could be utilized to form the recessed transfer areas within the scope of the invention although it has been found that the fine mesh screen is especially effective.

As stated above, both side surfaces 20 of the applicator 10 are smooth except for the openings 22 forming the recessed cement wells. These smooth surfaces thus can be easily wiped clean of any cement, and in the present invention this wiping is accomplished automatically as the applicator is withdrawn from a cement container 26. The latter comprises an elongated upright vessel that is fluidtight except for an opening at its upper end. This opening is covered by a top 28 having a slot type aperture 30 that provides a constrictive function in that its opposite edges constantly press against the opposite sides of the applicator 10 as it is moved from the container thereby providing a wiping action on the applicator. In the embodiment of FIG. 2, the top which provides this constrictive wiping action comprises an elastomeric member that is retained on the upper end of the container by a simple clamp 32. As shown in FIG. 4, the elongated slot-like aperture 30 in the elastomeric member 28 is somewhat narrower than the applicator thickness so that its edges 34 normally press against the applicator when it is inserted and provide a wiping action that removes cement except from the recessed cement wells when it is withdrawn. The elastomeric material of the top 28 must be of a type that does not react to the solvents in the cement so that its strength and elasticity is not diminished with use.

Another form of a top for the cement container embodying the principles of the present invention is shown in FIGS. 5 and 6. Here, a pair of generally semicircular shaped top members 36 are retained adjacent each other by an elastomeric collar 38. Both top members, which may be made from some rigid, inert material such as metal or plastic, have a recess 40 along their inner straight edge and these recesses form a slot 42 having a length slightly greater than the width of the applicator 10. However, when the applicator is not in the container, the slot between the adjacent top members 36 is narrower than the thickness of the applicator. The upper edges 44 along the recesses forming the slot are beveled to provide a surface indentation that is wider than the applicator thickness. The collar 38 that retains the two top members 36 provides a circumferential force constantly urging them together. Consequently, when the applicator is pushed into the container 26 having a top as shown in FIG. 5, the members 36 are forced apart, and as the applicator is withdrawn the members press against it and wipe its sides 20 free of excess cement, leaving considerable cement within the recessed well areas 18, however.

In operating the applicator 10 with a mechanized butt-splicing apparatus 12 as previously described, the applicator is first inserted into the container 26 filled with cement. As it is withdrawn, it is automatically wiped clean but retains a supply of cement in each of the well areas 18. With the jaws of the butt-splicing apparatus open and the articles to be connected aligned but spaced apart, the applicator is positioned between them with its cement wells aligned with the end faces 24 of the articles being spliced. This latter alignment may be accomplished quickly and easily with precision by means of a notch 46 located in the lower edge 48 of the applicator which fits over a bar 50, or the like, normally provided on the butt-splicing apparatus. The bar and the notch are so located that when meshed, the cement wells 18 of the applicator 10 are directly aligned with the article end faces 24.

The butt-splicing apparatus can now be actuated to bring the end faces of the articles toward the applicator and engage the opposite sides of each cement well. When this engagement takes place the cement immediately adheres with greater force to the smooth end faces of the articles than to the irregular recessed surfaces of the cement transfer areas. Thus, when the articles are retracted from the applicator a layer of the cement of a substantially uniform thickness is transferred to the article end faces 24. Now, the applicator can be removed and the aligned articles can be brought together to engage and form a firm bond.

To those skilled in the art to which this invention relates, many changes in construction and widely differing embodiments and applications of the invention will suggest themselves without departing from the spirit and scope of the invention. The disclosures and description herein are purely illustrative and are not intended to be in any sense limiting.

I claim:

1. An apparatus for accumulating a quantity of viscous material in a predetermined area for transfer to a surface of an article, comprising in combination:

an upright vessel containing a quantity of viscous material;

top means on said vessel having an elongated slot, and being resiliently yieldable to cause said slot to widen in response to a penetrating downward force therein;

an elongated applicator extending downwardly through said slot and into said vessel, said applicator having substantially parallel and smooth opposite side surfaces and a uniform thickness that is slightly greater than said slot, the edges of said slot thereby pressing against said side surfaces;

at least one recessed transfer area on said applicator;

and means within said transfer area having an irregular surface for retaining said viscous material;

whereby when said applicator is removed from said container the side edges of said slot are urged toward each other and wipe the viscous material from the smooth surfaces, leaving an amount of said viscous material in said recessed area.

2. An apparatus for accumulating a layer of viscous material in a predetermined area for transfer to an end face of an article, comprising in combination:

an upright vessel containing a quantity of viscous material;

top means on said vessel having an elongated slot, and being yieldable to cause said slot to widen in response to a penetrating downward force therein;

an elongated applicator extending downwardly through said slot and into said vessel, said applicator having substantially parallel and smooth opposite side surfaces and a nominal thickness that is slightly greater than said slot, the edges of said slot thereby pressing against said side surfaces;

at least one recessed area on an otherwise smooth surface of said applicator and spaced inwardly from the side edges thereof;

and means within said area having a relatively irregular surface comprised of a multiplicity of pockets for retaining said viscous material;

whereby as said applicator is withdrawn from said container the side edges of said slot are urged toward each other and against said applicator to wipe the viscous material from its smooth surfaces, an amount of said material remaining on said recessed area.

3. The container as described in claim 2 wherein said top means comprises a pair of rigid semicircular members each having an indentation on its inner side edge forming said slot; and a resiliently yieldable collar around the upper end of said container and around said members, urging them together.

4. The container as described in claim 2 wherein said top means comprises an elastomeric cover extending across the otherwise open upper end of said container, said cover having a transverse slot; and band means around the upper end of said container for retaining said cover thereon.

5. An applicator device for use with a container having a supply of viscous material for acquiring and retaining a quantity of such material and transferring it to another body, said device comprising:

an elongated body having a substantially uniform thickness with opposite sides having smooth surfaces;

a plurality of transfer areas on said opposite sides of said body;

and means in each said transfer area forming an irregular surface for retaining a quantity of viscous material.

6. The applicator device of claim 5 wherein each said transfer area is formed by an opening through said body, and means fixed in said opening, recessed between said opposite sides and having a multiplicity of indentations for retaining viscous material.

7. The applicator device of claim 6 including a plurality of said openings spaced apart on said elongated body, said latter means comprising sections of fine mesh screen fixed to the walls of said openings.

References Cited

UNITED STATES PATENTS

| 2,157,432 | 5/1939 | Pitar et al. | 15—521 |
| 3,033,213 | 5/1962 | Joss et al. | 15—521 X |

FOREIGN PATENTS

| 975,037 | 10/1950 | France. |

CHARLES A. WILLMUTH, *Primary Examiner.*

E. L. ROBERTS, *Assistant Examiner.*